United States Patent Office 2,958,625
Patented Nov. 1, 1960

2,958,625

ORGANIC MERCURY COMPOSITIONS

Rudolph Rebold, Ossining, N.Y., assignor to Gallowhur Chemical Corporation, a corporation of New York No Drawing. Filed Sept. 29, 1958, Ser. No. 763,781

3 Claims. (Cl. 167—42)

The present invention relates to organic mercury compositions which are highly concentrated with respect to the content of phenylmercury acetate and equivalent metallic mercury and more especially to a clear, stable, aqueous solution of phenylmercury acetate containing approximately 60% of phenylmercury acetate.

It is well known that phenylmercury acetate is very difficultly soluble in water and is soluble under normal conditions to the extent of only about one part of phenylmercury acetate to six hundred parts of water. For this reason, it is not possible to make concentrated aqueous solutions of phenylmercury acetate, although such have been very greatly desired for a number of years.

Phenylmercury acetate is one of the most important organic mercury compounds useful for imparting bactericidal and fungicidal properties to many products, such as agricultural sprays, paint, textile and leather treating solutions, and the like. Many investigators have worked on this problem and have made it possible to provide aqueous phenylmercury acetate solutions having a concentration in the range of 5% to 30%, but this has been recognized as being only a partial solution of the problem and in addition, concentrations in the neighborhood of 20% to 30% of phenylmercury acetate have been found to be unstable. In addition, such products are not usually compatible with both aqueous and oil systems so that a product which is useful, for example, as an agricultural spray, cannot be employed as an additive to paints having an oil base.

The problem has heretofore been attacked through:

(a) The use of ammonium hydroxide and ammonium salts;

(b) The formation of alkanolamine salts; and (c) The use of a polyalkylene condensation product with a fatty acid.

These proposals have, in some instances, met with reasonable success, but have been found not to represent a complete solution of the problem, because it is still necessary with such products to ship a great deal of water or organic solvent which is not only uneconomical, but which presents transportation problems, fire hazards and the like. As a result, the industry is still seeking to find some way in which very high concentrations of phenylmercury acetate can be achieved in a manner which will be compatible with either water or oil systems.

In accordance with the present invention, it has been discovered that a very highly concentrated solution of phenylmercury acetate can be obtained wherein the phenylmercury acetate constitutes about 60% with a correspondingly high equivalent metallic mercury content. A solution in accordance with the invention is unique and has never been produced before in such a high concentration and under conditions such that the resulting composition is useful, both in water and in oil systems.

A composition responding to the present invention contains the following constituents in approximately the following proportions by weight:

| | Grams |
|---|---|
| Phenylmercury acetate | 336 |
| Monoethanolamine | 61 |
| Polyoxyethylene sorbitan monolaurate (Tween 20) | 56 |
| Water | 107 |

By calculation from the foregoing, it will be seen that the phenylmercury acetate amounts to 60%, the monoethanolamine amounts to approximately 11% and the polyoxyethylene sorbitan monolaurate amounts to 10%, the balance being water which is only approximately 19%. This composition forms a clear, stable solution, having a very slight amber color which, when the composition is diluted for end use, becomes imperceptible or disappears. The composition is also stable against light, so that it need not be protected against actinic rays by using a brown container, as is required with existing phenylmercury acetate solutions. The stability of the composition is further evidenced by the fact that even after the passage of a considerable period of time no precipitate or turbidity appears. Even more surprising is the fact that when the composition of the invention is diluted with ordinary tap water containing chlorine ions, no precipitate is formed, even though phenylmercury acetate solutions, as previously known, are sensitive to the presence of chlorine ions and other ions commonly found in water used for drinking or industrial purposes.

The proportions set forth above have been found to be critical in that more than minor variations therefrom do not produce the required results. The constituents themselves have also been found to be critical, because like results cannot be obtained by using any other alkanolamine and attempts to substitute diethanolamine or triethanolamine for monoethanolamine were unsuccessful, since a 60% concentration of phenylmercuric acetate can only be obtained when the alkanolamine is monoethanolamine. When other Tweens, such as Tween 40, Tween 60 and other non-ionic detergents and emulsifiers were substituted for Tween 20, the present results could not be obtained.

It is particularly noteworthy that the phenylmercuric acetate content of the solution amounted to considerably more than three times the amount of water present in distinct contrast with prior known solutions of phenylmercuric acetate.

While the exact mechanism of the interaction which takes place among the constituents is not precisely known, there is presumably formed a double complex of phenylmercuric acetate with the monoethanolamine and with the polyoxyethylene sorbitan monolaurate, which double complex is exceptionally soluble in water to an extent not heretofore achieved in any other way and at the same time the complex is fully compatible with oil base systems such as occur in oil paints. An exothermic reaction presumably occurs, because when the constituents are combined a rise in temperature can be observed, thus indicating that a chemical reaction has taken place.

Although the composition as set forth above contains relatively little water (only approximately 19%), even that can be dispensed with for shipping and storage purposes. Thus, the phenylmercury acetate, the monoethanolamine and the polyoxyethylene sorbitan monolaurate in the above indicated proportions by weight can be combined and shipped in that form and the designated amount of water added by the recipient to produce the complete composition or solution which is then re-shipped for final dilution and use as 5% solutions, as an agricultural spray, an additive for paints, a treatment for textiles and leather and for the many other uses to which phenylmercury acetate solutions are put by industry.

The invention accordingly comprises a stable highly concentrated organic mercury composition containing approximately 60% of phenylmercury acetate, particularly in the form of a clear, stable, aqueous solution compatible with both water and oil base preparations of many different formulations. The present invention is in contrast with previously known solutions of phenylmercury acetate in which it has not been possible to go beyond a 30% concentration of phenylmercury acetate and even as to which the stability is unsatisfactory.

The invention is defined by the appended claims.

What is claimed is:

1. A stable highly concentrated organic mercury composition comprising the following constituents in approximately the following proportions, by weight:

| | Grams |
|---|---|
| Phenylmercury acetate | 336 |
| Monoethanolamine | 61 |
| Polyoxyethylene sorbitan monolaurate | 56 |
| Water | 107 |

2. A clear stable highly concentrated aqueous solution of phenylmercury acetate containing about 60% of phenylmercury acetate, about 11% of monoethanolamine and about 10% of polyoxyethylene sorbitan monolaurate, the balance being water.

3. A composition comprising, by weight, approximately 336 parts of phenylmercury acetate, approximately 61 parts of monoethanolamine and approximately 56 parts of polyoxyethylene sorbitan monolaurate, said composition when admixed with approximately 107 parts of water forming a clear stable aqueous highly concentrated solution containing approximately 60% of phenylmercury acetate.

References Cited in the file of this patent

UNITED STATES PATENTS

| | | |
|---|---|---|
| Re. 24,184 | Sandors | July 24, 1956 |
| 2,241,829 | Six et al. | May 13, 1941 |
| 2,824,825 | Rath | Feb. 25, 1958 |

OTHER REFERENCES

Schwartz: Surface Active Agents, vol. 1, Intersci. Pub., Inc., N.Y., 1949, pp. 34, 40, and 74.